Figure 1:
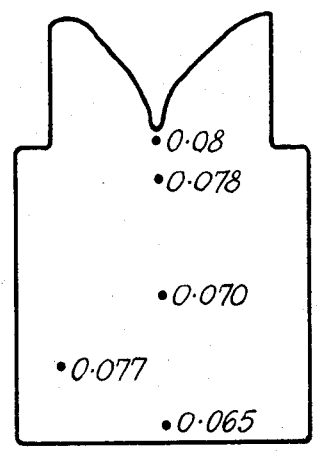

United States Patent [19]
Rumbold et al.

[11] 3,811,898
[45] May 21, 1974

[54] HEAT-INSULATING ANTIPIPING COMPOSITIONS

[75] Inventors: Bernhard Carl Rumbold; John Edward Cartwright, both of Nechells, England

[73] Assignee: Fiseco International Limited, Birmingham, England

[22] Filed: Feb. 20, 1973

[21] Appl. No.: 334,017

Related U.S. Application Data
[63] Continuation of Ser. No. 92,208, Nov. 23, 1970, abandoned.

[30] Foreign Application Priority Data
Nov. 25, 1969  Great Britain............... 57595/69

[52] U.S. Cl............ 106/38.28, 106/38.3, 106/38.9, 164/53, 249/202

[51] Int. Cl............................................ B28b 7/36
[58] Field of Search........... 106/38.22, 38.28, 38.27, 106/38.9, 38.3; 164/53; 249/202; 264/29

[56] References Cited
UNITED STATES PATENTS

| | | | |
|---|---|---|---|
| 3,308,514 | 3/1967 | Osborn et al. | 164/41 |
| 3,326,273 | 6/1967 | Jago et al. | 106/38.27 |
| 3,448,181 | 6/1969 | Olstowski et al. | 106/38.27 UX |
| 3,573,122 | 3/1971 | Olstowski et al. | 264/29 |

*Primary Examiner*—Lorenzo B. Hayes
*Attorney, Agent, or Firm*—Wolfe, Hubbard, Leydig, Voit & Osann, Ltd.

[57] ABSTRACT

Antipiping compounds for use in metal casting comprise a refractory heat insulating material and 10 – 40 percent by weight of acid-treated graphite.

6 Claims, 2 Drawing Figures

HEAT-INSULATING ANTIPIPING COMPOSITIONS

This is a continuation of application Ser. No. 92,208 filed Nov. 23, 1970 now abandoned.

This invention relates to heat-insulating antipiping compounds.

In the casting of molten metal to form ingots or castings, it is common practice thermally to insulate the topmost portions of the body of molten metal just after pouring has ceased; in this way feed of metal to the body of the ingot or casting to compensate for the shrinkage on solidification is maintained. The thermal insulation is often partly accomplished by the provision, on the exposed molten metal surface, of a layer of a heat insulative composition. Since such a layer minimises the formation of pipe, the materials used are referred to simply as heat-insulating antipiping compounds, and this term will be used herein for simplicity of expression.

According to a first feature of the present invention there is provided a heat insulating antipiping compound which comprises acid treated graphite together with a refractory heat insulating material. Preferably the proportions and types of the two materials are so chosen that on application to an exposed molten metal surface, the expansion of the layer of material applied is to not more than 15 times and preferably not more than 10 to 12 times the original thickness. Preferably the proportion of acid treated graphite in the compound is in the range of 10 – 40 percent by weight, most preferably 15 – 40 percent by weight.

The other main constituent of the compound is a refractory heat insulating material, for example a refractory filler such as grog, silica flour, alumina, bauxite, magnesia, clays such as ball clay or china clay or any suitable refractory silicate; light weight fillers such as vermiculite, perlite and pumice may also be used. Carbonaceous materials may also be used. It is also possible to use a compound which on heating will afford a refractory material; such materials are for example, lime (calcium hydroxide) and magnesium carbonate. The grain size of such material is preferably such that it does not segregate from the mixture and such that the mixture can be pelletized, granulated or tabletted as required.

Acid treated graphite is a general term to describe graphites the particles of which on heating, intumesce to give a low density highly heat insulative vermicular structure. These graphites may be prepared by treating flake graphite with mixtures of sulphuric acid with nitric acid, or perchloric acid and then removing the so treated graphite from the acid. The acid mixture may contain an inorganic oxidising agent such as chromium trioxide, potassium chlorate or potassium permanganate. The so treated graphite will, on heating, usually to temperatures in excess of 150°C, expand to many times its original volume.

The antipiping compounds defined above may be in powder form, but are preferably granulated or formed into tablets; a small proportion of a clay or other binder may be included in the composition to aid pelletisation.

It is found that the antipiping compounds of the invention are of particular value in the casting of molten metals, particularly ferrous metals.

According, therefore, to a further feature of the invention there is provided a method of casting molten metal to form an ingot or casting wherein, after the molten metal has been poured into a mould, there is applied to the surface of the molten metal in the feeder head a heat insulating antipiping compound as defined above. The amount of antipiping compound applied is preferably sufficient to give a layer of expanded heat insulative material at least 25 mm thick on the top of the molten metal.

It is found that, contrary to expectation, results obtained by the use as antipiping compound of acid-treated graphite alone are unsatisfactory. The high concentration of carbonaceous material tends to affect the carbon content of the metal being cast, and this is disadvantageous, especially when the metal is ferrous. Additionally, there is a tendency for the expanded carbon, which is of extremely low apparent density, to blow away from the metal surface, for example under the influence of draughts, thus minimising its efficiency as a heat-insulative layer and presenting an air pollution problem. There is a tendency for oxidation of the carbon in contact with the air in finely divided form, and it is difficult, accurately, to apply a small dosage of unexpanded acid treated graphite to give just the desired thickness of expanded layer over the whole surface of the molten metal. It is found in practice that acid-heated graphite used alone expands to substantially more than 15 times its thickness and this is a serious disadvantage since it results in overspill and waste. If sufficient unexpanded acid treated graphite is applied so as to cover completely the surface of the molten metal the thickness of the expanded layer will be excessive. The incorporation of the refractory material overcomes all these disadvantages.

With most acid-treated graphite, there is a tendency during use to the generation of acid and unpleasant fume. This tendency may be counteracted by incorporating in the antipiping compound a proportion of a basic material, for example calcium hydroxide, sodium carbonate, magnesium hydroxide and magnesium carbonate. Generally a proportion of basic material up to 10 percent by weight of the compound is suitable. In some cases however the refractory heat-insulating material may itself be basic, e.g., where magnesium oxide is employed.

As noted above, there may be a tendency to oxidation of the finely divided carbon formed on expansion of the acid treated graphite. This oxidation, which results in a reduction in the thickness of the layer of antipiping compound and which would be deleterious to heat insulating properties may be avoided by incorporating in the antipiping compound a finely divided easily oxidisable material such as aluminium, magnesium or calcium silicide, which will be oxidised preferentially to the acid treated graphite. Generally an amount of up to 20 percent by weight of such an addition may be made.

It may also be of value to incorporate a proportion, e.g. 5 to 15 percent by weight of fibrous material, either organic or inorganic in the antipiping compound, to help maintain the integrity of the layer of expanded antipiping compound. The fibrous material may have, for preference, a fibre length of 3 to 10 mm.

The antipiping compounds of the present invention are suitable for both foundry and steelworks use; they can be used on a wide variety of metals both ferrous and non-ferrous (e.g., copper).

The following specific examples will serve to illustrate the invention:

EXAMPLE 1

400 grams of a mixture comprising 25 percent acid treated graphite, 25 percent ball clay, and 50 percent grog, were placed on a 23 cm square hot plate maintained at 1,420°C. The rate of heat loss after 14 minutes was found to be equal to that obtained using 1,000 grams of a conventional proprietary exothermic antipiping compound in an identical fashion. After 35 minutes the total heat lost was the same in both cases.

A 20 cm cube casting was made using a bottom running system, and risered with a 15 cm high by 15 cm internal diameter, mildly exothermic sleeve. The casting was made in steel (0.2 – 0.4 percent carbon) poured at 1,580°C. 260 grams of the above mixture was applied immediately after pouring as an antipiping compound. The initial thickness of the layer of antipiping compound was 12 mm, and in contact with the molten metal it expanded to about 50 mm. No fume was evolved. On sectioning the final casting longitudinally, pipe was found to be contained within the region of the riser; analysis of the cast metal revealed no significant carbon pick-up.

EXAMPLE 2

The following composition, when granulated, acted as an efficient insulating antipiping compound:

|  | % by weight |
| --- | --- |
| acid treated graphite | 20% |
| grog | 50% |
| ball clay | 25% |
| calcium hydroxide | 4% |
| dextrose | 1% |

EXAMPLE 3

An antipiping composition in powder form was made up of:

|  | % by weight |
| --- | --- |
| acid treated graphite | 20% |
| grog | 40% |
| ball clay | 25% |
| aluminium powder | 10% |
| calcium hydroxide | 5% |

EXAMPLE 4

An antipiping composition in powder form was made up of:

|  | % by weight |
| --- | --- |
| acid treated graphite | 25% |
| ball clay | 55% |
| aluminium powder | 5% |
| rayon | 10% |
| calcium hydroxide | 5% |

EXAMPLE 5

An antipiping composition in powder form was made up of:

|  | % by weight |
| --- | --- |
| acid treated graphite | 30% |
| vermiculite | 25% |
| grog | 39% |
| calcium hydroxide | 6% |

EXAMPLE 6

In this example a comparison is made between acid-treated graphite used alone, and an antipiping compound of the present invention.

Two 20 cm cube castings were made with low carbon steel (nominally 0.1 percent) poured at approximately 1,580°C. Each casting was risered with a 15 cm I.D. × 15 cm high cylindrical insulating sleeve, and the moulds were made with sodium silicate bonded sand. On one casting, illustrated in FIG. 1, an antipiping compound of the following composition was used:

|  | % by weight |
| --- | --- |
| acid treated graphite | 25% |
| ball clay | 70% |
| calcium hydroxide | 5% |

Figure 2:
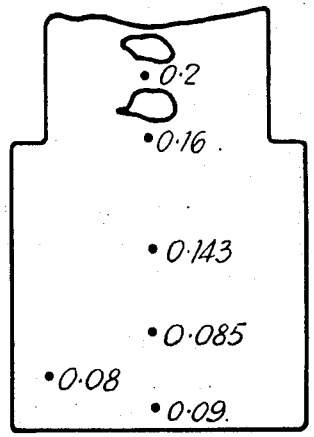

On the other, illustrated in FIG. 2, acid treated graphite alone was utilised.

Both materials were applied to the surface of the metal in the riser at a rate of 0.32 g/cm² immediately after pouring had ceased. On the casting of FIG. 1 the antipiping compound expanded to give a layer approximately 20 mm thick at the edge of the riser. On the casting of FIG. 2 the acid treated graphite expanded to a height of approximately 36 mm at the edge of the riser; this exceeded the height allowed for the antipiping compound (25 mm), which height is that used in practice when producing castings of similar size, and the expansion resulted in overspill and wastage of material.

Approximately 5 minutes after casting considerable collapse due to burn-out of the acid treated graphite on the casting of FIG. 2 was noticeable. This continued until the metal surface was visible (approximately 10 minutes), when it was seen that in addition to burn-out rapid dissolution of the expanded graphite in the molten metal was occurring. This action continued until the material was completely dissolved (16 minutes) giving appreciable fume during the process.

In contrast to this the antipiping compound on the casting of FIG. 1, apart from collapse due to metal shrinkage, remained intact for the duration of the test.

After shake out, both castings were sectioned longitudinally. Metal samples were taken from various points on the section face vertically below the riser pipe, and also from towards the base of the cube and away from the line of pipe. The latter samples were taken as representative of the base material. The cross sections of the castings and the location of the test positions are shown in FIGS. 1 and 2.

Carbon analyses were carried out on each of the samples. With the antipiping compound, carbon pick-up was found to be negligible, figures of 0.08, 0.078, 0.07, 0.077 and 0.065 percent being recorded. With the acid treated graphite used alone there was found to be substantial carbon pick-up both in the riser and in the casting itself, the corresponding figures for carbon content being 0.2, 0.16, 0.143, 0.085, 0.08 and 0.09 percent.

The antipiping compounds of this invention have a wide variety of commendable qualities: they are clean and non dusting in use; they do not generate noxious or undesirable fume; they are relatively economic to manufacture and use, and can easily be formed into easily handleable tablets, pellets or granules. As indicated, carbon pick-up by the molten metal is low.

We claim as our invention:

1. In a heat-insulating composition comprised of at least one refractory heat-insulating material selected from the group consisting of vermiculite, perlite, pumice, grog, sand, silica flour, alumina, bauxite, magnesia, clays and other refractory silicates, the improvement wherein said composition contains about 10–40 percent by weight of acid-treated graphite which on heating intumesces to give a low density highly insulative vermicular structure, said composition yielding a heat-insulative layer when placed on the exposed surface of molten metal in combination with a minimization of carbon pick-up by the metal and dust generation.

2. A heat-insulating composition according to claim 1 wherein the proportions and types of the two materials are so chosen that on application of a layer of said composition to an exposed molten metal surface, the layer expands to not more than 15 times its original thickness.

3. A heat-insulating composition according to claim 1 which contains 15–40 percent by weight acid treated graphite.

4. A heat-insulating composition according to claim 1 which contains up to 10 percent by weight of a basic material.

5. A heat-insulating composition according to claim 4 wherein the basic material is calcium hydroxide.

6. A heat-insulating composition according to claim 1 which contains 5 to 15 percent by weight of fibrous material.

* * * * *